July 22, 1952  S. H. NORTON  2,604,368
PISTON RING
Filed Sept. 20, 1950
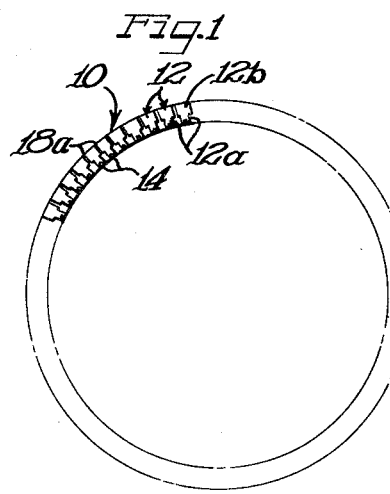
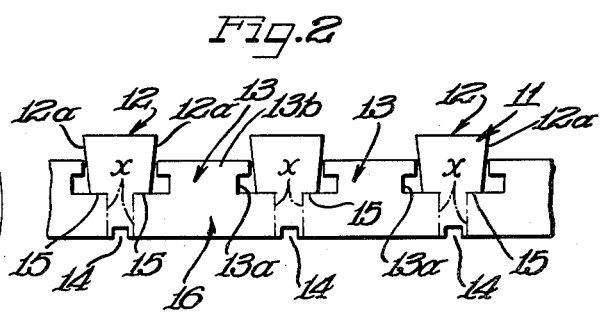
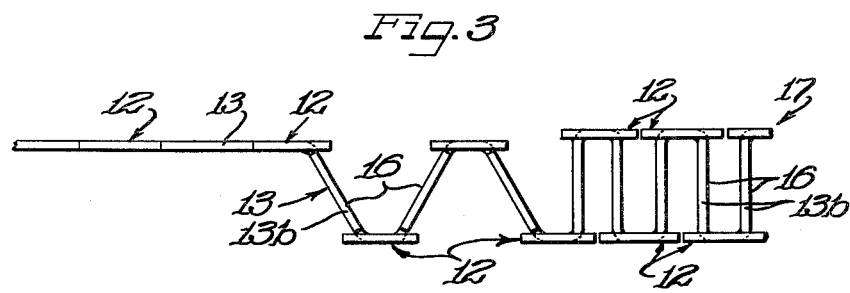
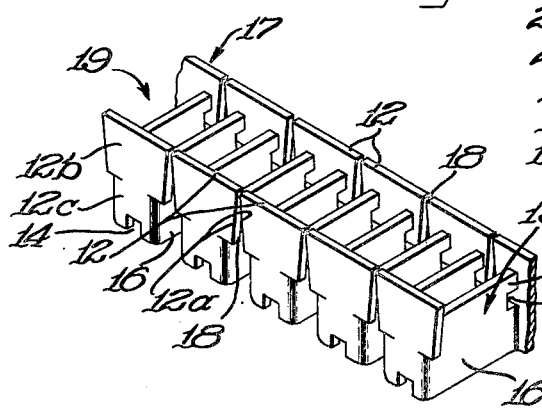
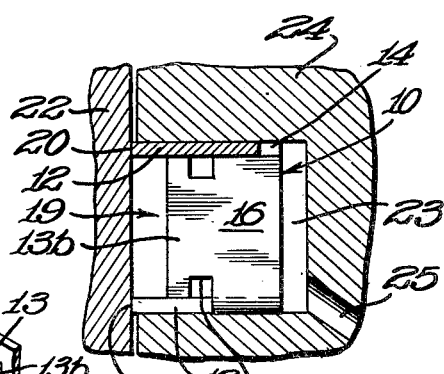
Inventor:
Samuel H. Norton Patented July 22, 1952

2,604,368

UNITED STATES PATENT OFFICE 2,604,368

PISTON RING

Samuel H. Norton, University Heights, Ohio, assignor to Thompson Products, Inc., Cleveland, Ohio, a corporation of Ohio Application September 20, 1950, Serial No. 185,803

6 Claims. (Cl. 309—44)

This invention relates to strut-reinforced flexible piston rings. Specifically, the invention deals with a piston ring having upper and lower annular layers of T-shaped ring segments with head edges providing active cylinder-engaging surfaces and with legs having integral connection with cross-over webs extending between the layers and equipped with projections forming struts rigidifying the segments.

According to this invention, a metal strip is cut to provide longitudinally spaced ring-forming segments along one edge thereof alternating with strut-forming projections on the same edge. The thus formed strip is then folded to position adjacent segments in spaced planes with the strut-carrying portions of the blank between the segments forming cross-over webs bridging the space between the planes. The bending is continued to position the inner faces of the segments in abutting relation with the ends of the struts. To facilitate feeding the cut strip material through forming and folding dies, the longitudinal edge of the strip opposite the edge carrying the ring segments and struts is provided with notches or recesses adapted to receive a feeding actuator.

The finished ring of this invention has axially spaced rings of circumferentially spaced T-shaped segments and the legs of each segment have integral cross webs extending from the longitudinal sides thereof. Each cross web carries a projection forming a strut abutting the ring segments. The resulting ring has open spaces between the webs and oil entering the space between the upper and lower rings or layers of the ring can readily drain back through oil holes provided in the oil groove of a piston. The folding of the blank to form the axially spaced layers of ring segments positions the spaces between the ring segments in offset or staggered relation. The initial blank can be cut so that the ring segments heads will have a keystone or wedge shape, thereby automatically providing gaps or slits of equal width between the segments and extending radially of the finished ring.

It is, therefore, an object of this invention to provide a piston ring having axially spaced layers of circumferentially spaced T-shaped ring segments connected through strut-carrying cross webs in abutting relation to the segments.

A further object of this invention is to provide an improved oil ring for pistons wherein axially spaced layers of circumferentially spaced T-shaped ring segments are reinforced by transverse struts on cross webs between the layers.

A still further object of the invention is to provide a sheet metal piston ring which is circumferentially resilient and has strut-reinforced axially spaced layers composed of circumferentially spaced T-shaped ring segments.

A still further object of the invention is to provide a circumferentially expansible and contractible sheet metal piston ring with strut-carrying cross webs reinforcing axially spaced layers of ring segments.

A further object of this invention resides in the provision of a sheet metal piston ring wherein integral projections on one longitudinal edge of a metal strip form reinforcing struts between axially spaced layers of ring segments.

Other and further objects of the invention will be apparent to those skilled in the art from the following detailed description of the annexed sheet of drawings which, by way of a preferred example, illustrates one embodiment of the invention.

On the drawings:

Figure 1 is a plan view of the piston ring of this invention.

Figure 2 is a fragmentary plan view of a strip of metal cut to form a blank for the ring of this invention.

Figure 3 is an end elevational view showing the manner in which the strip of Figure 2 is folded to form the ring of this invention.

Figure 4 is an isometric view of a portion of the folded strip.

Figure 5 is a fragmentary cross-sectional view of a piston and cylinder assembly having a ring according to this invention mounted in the oil ring groove of the piston.

As shown on the drawings:

The piston ring 10 of this invention is formed from a cut or punched strip 11 of sheet material such as unhardened spring steel or the like. The strip 11 has longitudinally spaced segments 12 projecting laterally along one longitudinal edge thereof. Each segment 12 alternates with a narrower projection 13 also extending laterally from the same longitudinal edge of the strip.

The opposite longitudinal edge of the strip has longitudinally spaced rectangular notches 14 cut therein in transverse alignment with the central portion of the segments 12.

Cuts or slits 15 extend inwardly from the sides of each segment along the longitudinal edge of the strip. As will be more fully hereinafter explained, the strip is bent along transverse lines at the inner ends of these cuts 15.

Each segment 12 has outwardly sloping side walls 12a, 12a so that the segments are longer at their outer edges than at their inner edges. The outer edges of the segments are parallel with the longitudinal edges of the strip.

The projections 13 between the segments 12 have narrow central neck portions 13a extending from the strips and longer head portions 13b parallel with the strip and extending into close relation with the tapered sides 12a of the segments 12 inwardly from the outer edges of the segments.

The strip 11 is folded along lines X to form the corrugated strip. The main body of the metal strip shown in Figure 3 thus has portions 16 lying between the fold lines and carrying the projections 13.

As shown in Figure 3, the strip 11 is folded or corrugated to position adjacent segments 12 in axially spaced planes while the projection carrying strip portions 16 form connecting webs between these planes. The projections 13 on these webs 16 will lie between the segments.

The resulting strip 17 formed by the folding or corrugating operation, as best shown in Figure 4, will have axially spaced layers of T-shaped ring segments separated by wedge-shaped spaces 18 between the segments in each layer. These spaces are defined by the tapered side walls 12a of the segments. Each segment 12 has a head portion 12b between the side walls 12a thereof and a leg portion 12c containing the notch 14 and projecting from the head portion. This leg portion lies between the bend lines X—X of the blank and has the webs 16 projecting from the sides thereof across the channel 19 provided between the layers of segments 12. The projections 13 on the webs 16 have the heads 13b thereof abutting the inner faces of the segments and the necks 13a thereof are spaced axially inward from the inner faces. The heads 13b lie in the same plane as the webs 16 and are thus inwardly from the edges 12a of the segments 12. Since the projections 13 are shorter than the segments 12, the heads 13b are also radially inward from the outer peripheral edges of the segments 12.

The strip 17 is coiled into the circular shape of the piston ring 10 and when in ring shape the tapered gaps 18 will become radial slits 18a of uniform width along their length. The tapers of the side walls of the segments are such that when the segments are disposed in a ring form they will become radii of the ring.

After the strip 17 is formed into a ring, it is heat treated to develop the spring properties of the metal and the outer peripheral edges of the ring segments are ground to present finished scraping edges 20 and 21 confronting the cylinder wall 22 when the ring 10 is seated in the oil groove 23 of a piston 24. The ring is circumferentially compressed in the cylinder and therefore has resilient, flexible pressure on the cylinder wall. The channel 19 of the ring 10 between the active scraping faces 20 and 21 of the ring is drained through an oil hole 25 provided in the piston. The notches 14 in the ring provide additional openings for drainage of the channel.

The strut head 13b, as illustrated in Figure 5, holds the ring segments 12 against deflection and maintains the desired axial spacing of the segments. At the same time, the connecting web 16 permits expansion and contraction of the ring through circumferential movement of the ring segments relative to each other.

From the above descriptions, it should therefore be understood that the invention provides a sheet metal piston ring wherein axially spaced layers or rings composed of circumferentially spaced ring segments are reinforced by strut extensions on cross webs which are integral with legs of reduced width on the ring segments.

It will be understood that modifications and variations may be effected without departing from the scope of the novel concepts of the present invention.

I claim as my invention:

1. A piston ring comprising axially spaced layers of circumferentially spaced ring segments connected by cross webs in circumferentially spaced relation integral with the ring segments and each having a strut extension between the layers in abutting relation with the inner faces of the ring segments.

2. A self-expanding flexible piston ring comprising superimposed layers of circumferentially spaced ring segments, each of said ring segments being T-shaped and having a head portion defining an active scraping surface with its outer edge together with a leg portion of reduced width projecting radially from the head portion, webs on the sides of each leg portion extending transversely across the space between the layers, and projections on said webs extending into the space between the heads of the segments in abutting relation with said heads for providing rigidifying struts.

3. A piston ring comprising axially spaced parallel rings each composed of circumferentially spaced T-shaped segments having head portions defining active scraping faces with their outer edges and leg portions of less width than the head portions extending radially inward from the head portions, each of said leg portions having a web extending across the space between the rings, and a strut on said web projecting into the space between the heads of the T segments in abutting relation to said heads for rigidifying the heads against deflection.

4. A piston ring comprising a channeled annulus having spaced apart sides composed of a plurality of separated T-shaped segments, each of said segments being supported by a radially extending web integral with the legs of the T-shaped segments, and each web having a strut portion abutting the inner faces of the heads of the T-shaped segments.

5. A self-expanding flexible piston ring comprising a channel-defining annulus having spaced sides composed of separated T-shaped segments with head portions defining ring edges along their outer peripheries and with leg portions extending radially inward from the head portions and being of reduced width, webs integral with the sides of the leg portions bridging the space between the sides of the ring and connecting the T-shaped segments in staggered relation with the spaces between the segments being out of alignment, and projections on said sides extending into the space between the heads of the segments in abutting relation with said heads.

6. A self-expanding piston ring comprising axially spaced concentric rings each composed of separated T-shaped ring segments having enlarged head portions defining the peripheries of the rings and reduced width tail portions extending radially from the head portions and having notched recesses at their inner ends, circumferentially spaced radially extending cross webs integral with the side edges of the legs, and strut extensions on said cross webs lying between the head portions of the T-shaped segments in abutting engagement with the inner faces thereof.

SAMUEL H. NORTON.

REFERENCES CITED

The following references are of record in the file of this patent:

UNITED STATES PATENTS

| Number | Name | Date |
|---|---|---|
| 2,267,367 | Bowers | Dec. 23, 1941 |
| 2,272,632 | Bowers | Feb. 10, 1942 |
| 2,333,457 | Zahodiakin | Nov. 2, 1943 |
| 2,390,044 | Bowers | Dec. 4, 1945 |